Dec. 20, 1960     E. L. SCHLAGE     2,965,382
ADAPTOR FOR A ROTATABLE TOOL
Filed Dec. 1, 1958     2 Sheets-Sheet 1
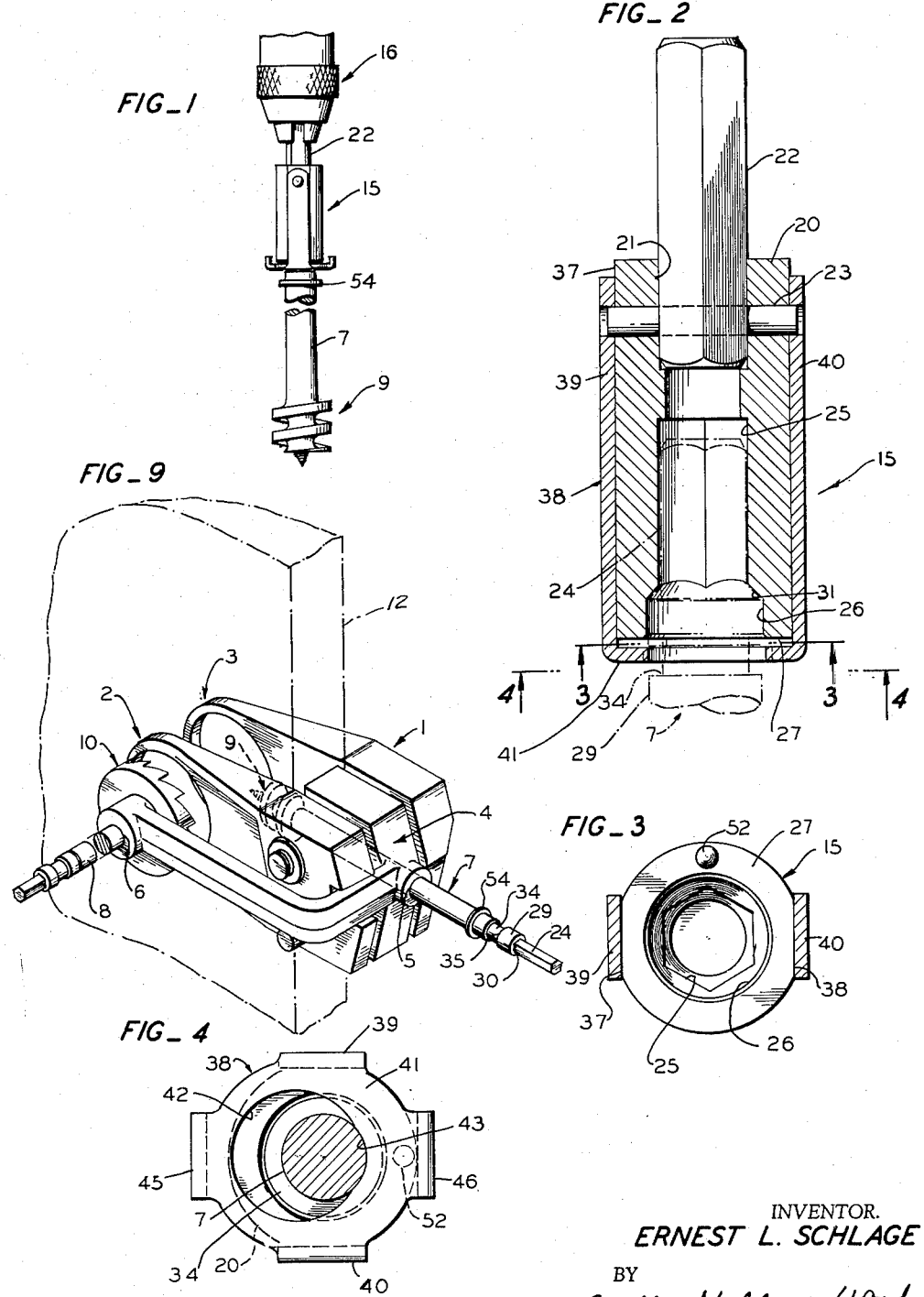
INVENTOR.
*ERNEST L. SCHLAGE*
BY
*Boyken, Mohler & Wood*
ATTORNEYS

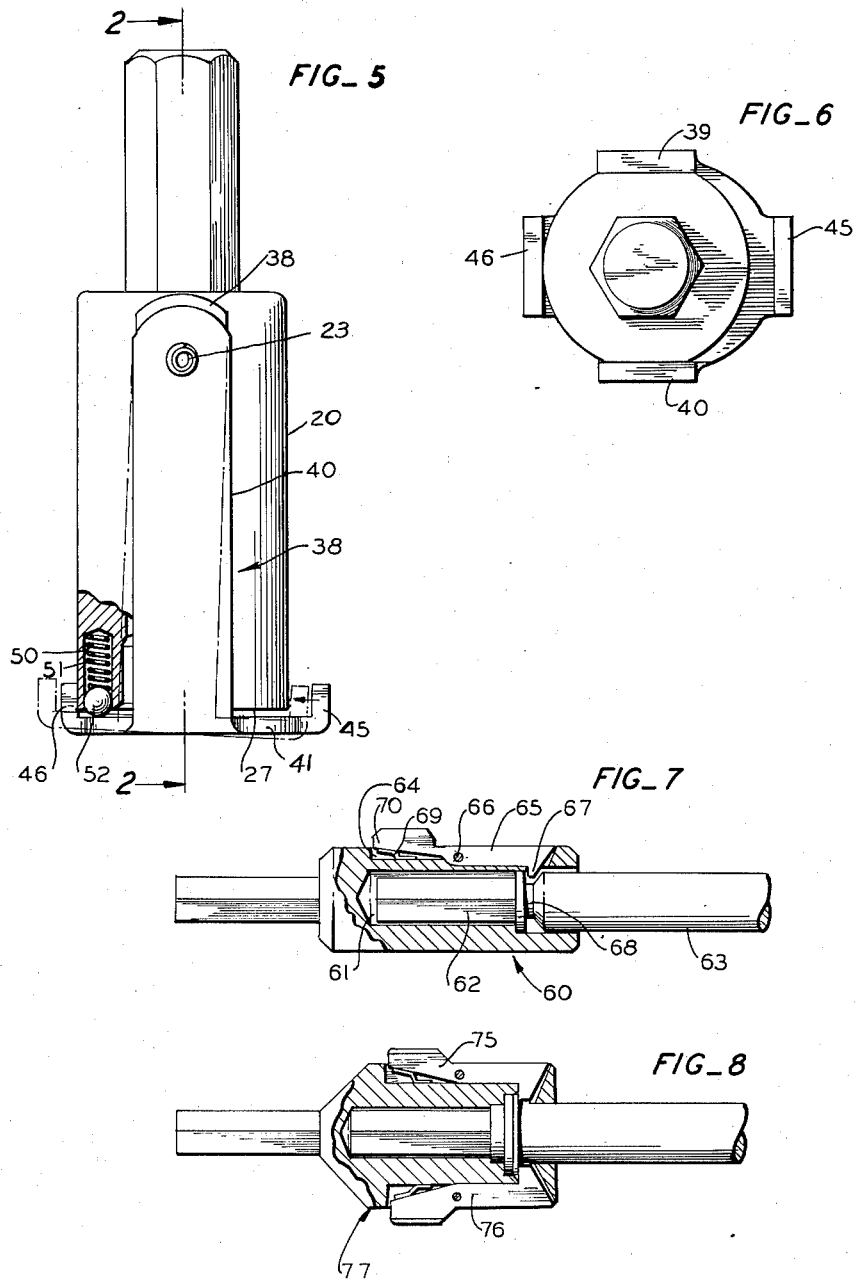

United States Patent Office 2,965,382
Patented Dec. 20, 1960

2,965,382

ADAPTOR FOR A ROTATABLE TOOL

Ernest L. Schlage, Burlingame, Calif., assignor to Schlage Lock Company, a corporation Filed Dec. 1, 1958, Ser. No. 777,266

5 Claims. (Cl. 279—77)

This invention relates to an adaptor for use in connecting the stem of a tool such as a boring bit with a chuck on a boring device or a power driven drill to which the tool is to be connected for rotation.

The invention will be described in connection with a boring bit and jig for use in boring holes in a door but it will be understood that it may be employed with any kind of tool that is connected to a means for effecting rotation of the tool.

In many instances it is desirable to be able to quickly connect and disconnect the stem of a boring bit with the chuck of an electric boring device or whatever other means is employed for transmitting rotational effort to the tool. For example, in boring the two holes required for reception of a cylindrical lock in a door not only is it necessary that the chuck of the drill be connected to one bit and then the other but the same change must be accomplished by a carpenter from one door to the next one.

The main object of the present invention is the provision of an adaptor that permits the user to quickly connect and disconnect a chuck relative to a tool to be rotated.

Another object of the invention is the provision of a device adapted to be secured to a chuck to permit the chuck to be connected to a tool and disconnected as speedily as possible without requiring tightening and untightening of the chuck when a different tool is to be driven.

Still another object of the invention is the provision of an adaptor for eliminating otherwise wasted time in boring the holes in a door preparatory to installing a cylindrical lock.

Other objects and advantages will be apparent from the attached specification and drawings.

Fig. 1 is a top plan view of the preferred form of the invention shown in its working position attached to a chuck and to a boring bit.

Fig. 2 is an enlarged longitudinal section through the adaptor of Fig. 1.

Fig. 3 is a cross section through the detent of the adaptor as taken along lines 3—3 of Fig. 2 and showing the socket end of the adaptor in elevation.

Fig. 4 is a cross section through the stem of the tool as taken along lines 4—4 of Fig. 2 and showing the end of the detent in elevation.

Fig. 5 is a side elevation of the adaptor showing the disconnected position of the detent in dot-dash line and with a portion of the socket member broken away and in section to show the spring urged means that engages the detent.

Fig. 6 is an end elevation of the chuck end of the adaptor.

Fig. 7 is a side elevation of a modified form of adaptor showing the same attached to the stem of a tool with portions of the adaptor broken away and in section to show internal structure.

Fig. 8 is a side elevation of another modified form of the invention showing the same attached to the stem of a tool and with portions of the adaptor broken away and in a section to show internal structure.

Fig. 9 is a perspective of a boring jig with two boring bits attached as illustrating one application of the invention.

In detail, and with reference to Fig. 9, one application of the present invention is for use in boring the holes in a door required for installation of a cylindrical lock. One method of performing this operation is to employ a jig such as the type shown in copending application Serial No. 777,515 filed December 1, 1958. Such a jig is generally indicated 1 in Fig. 9 and comprises a pair of opposed clamping jaws 2, 3 which are adapted to be clamped on the opposite faces of a door, and a clamping jaw support 4. The support 4 is provided with a pair of guide bearings 5, 6 respectively for rotatably supporting and guiding the stems 7, 8 respectively of a pair of boring bits 9, 10.

The bit 10 is adapted to bore the relatively large hole extending between the opposite faces of the door 12 (indicated in dot-dash lines in Fig. 9), and bit 9 is adapted to bore the somewhat smaller hole extending inwardly from the edge of the door.

After the jig 1 is installed in the proper position on the door it is desirable to be able to connect the chuck of a drill or other boring device to the stems 7, 8 successively to perform the boring operations. Naturally it is very time consuming to clamp the chuck of the drill on each stem and to unclamp the chuck after each bit has been used. The adaptor of the present invention is adapted to be clamped in the chuck and is provided with a quick operating detent for securement to the bit stem.

Thus, referring to Fig. 1, the adaptor generally designated 15 is employed intermediate the chuck 16 and the stem 7 of bit 9 (or the stem 8 of bit 10).

As best seen in Fig. 2, the adaptor comprises an elongated body 20 of steel or the like which is provided with a recess 21 at one end for receiving therein one end of a shank 22 preferably of noncircular cross section. Shank 22 is adapted to be received in the chuck 16 (Fig. 1) of a drill or the like.

The shank 22 may be press fitted within recess 21 or, as shown in Fig. 2, held therein by a pin 23 extending transversely through body 20 and projecting outwardly at both of its ends from body 20 for a purpose to be described.

The opposite end of body 20 is also provided with a recess 25 for receiving therein the end of the bit stem, such as stem 7 of Fig. 1. By the present invention the end of the bit stem opposite the cutting head is formed to a noncircular cross section as indicated at 24 (shown as hexagonal in Fig. 9). The recess 25 in body 20 is formed complementarily to the end of the stem so as to receive the latter therein and to insure that the body 20 and the bit stem rotate together as a unit.

The outer end of recess 25 is enlarged to a circular cross section thereby providing a relatively short bore 26 opening outwardly of the axially directed face 27 of the body 20 (Figs. 2, 3). Bore 26 is adapted to receive therein the portion 29 of stem 7 that is inwardly of the end portion 24. Said portion 29 may be the same diameter as the remainder of the stem.

The shoulder 30 formed by the juncture between the non-circular portion 24 of stem 7 and the circular portion 29 seats against the shoulder 31 formed at the juncture between the noncircular recess 25 and the short bore 26 so that there is no tendency for the stem to be jammed in the recess 25.

As best seen in Fig. 9 a peripherally extending relatively wide groove 34 is formed in stem 7 outwardly of circular portion 29 so that when the stem 24 is inserted in the body 20 the shoulder 35 between groove 34 and portion 29 of the stem 7 coincides with the outer axially directed end or face 27 of body 20.

When the stem 7 is received in the recess 25 a detent generally 38 is adapted to be received in groove 34 as best seen in Figs. 2, 4. The body 20 is formed with a pair of flats 37, 38 on opposite sides thereof for swingably supporting thereon the legs 39, 40 of detent 38, which legs are joined together at one of their corresponding ends by a detent plate 41.

Legs 39, 40 are pivotably secured at their ends opposite plate 41 on pin 23 which is employed to secure shank 22 to body 20 so that plate 41 may be oscillated about the axis of pin 23.

Plate 41 is provided with a relatively large substantially circular hole 42 (Fig. 4) permitting the stem 7 of bit 9 to be received therethrough. Hole 42 is preferably enlarged as at 43 at a point along an axis perpendicular to the axis of pin 23 and the enlarged portion is formed to a radius about equal to the radius of stem 7 at groove 34. From Fig. 4 it will be apparent that when portion 43 of plate 41 is received in groove 34 of stem 7 withdrawal of stem 7 from body 20 is prevented. However, to permit such withdrawal it is merely necessary to swing detent 38 about pin 23 so that the portion 43 of plate 41 is removed from groove 34 so that stem 7 can be moved through hole 42. The plate 41 is provided with a pair of flanges 45, 46 which facilitate manual movement of the detent.

By the present invention the detent 38 is spring urged into the groove 34 so that it must be manually withdrawn when it is desired to remove the adaptor from the stem.

The preferred form of the means for spring urging the detent into groove 34 is best seen in Fig. 5. A longitudinally extending hole 50 is drilled into body 20 from face 27 for receiving a compression spring 51 therein. Spring 51 urges a ball 52 outwardly of hole 50 into engagement with the inner side of end plate 41 of detent 38. It will be noted that ball 52 is positioned on a diametral line at right angles to the axis of pin 23 so that upon swinging the detent to the left from the full line central position of Fig. 5 to the dot-dash line position the ball 52 is urged inwardly of hole 50. Upon release of the detent 38 the ball 50 of course urges the detent back to the full line position, that is, the position shown in Fig. 4 wherein the detent is received in groove 34. The normal position of detent 38 is the full line position of Fig. 5 at which position the line of action of ball 50 is perpendicular to the plate 41 and it will be noted from this figure of the drawing the opening in the plate is misaligned or out of register with the open end of the socket body. The flange 46 of plate 41 is positioned so that it engages the side of body 20 of the adaptor (Figs. 5, 6) to prevent swinging of detent 38 except in the direction which compresses spring 51. From a consideration of Fig. 5 it will be seen that the ball 52 urges the detent to the right but such movement is prevented by flange 46.

In operation, when the adaptor is secured to the chuck 16 of the drill, or to whatever other means is employed to rotate tool 9, it is merely necessary to swing detent 38 to the dot-dash position of Fig. 5, in which position the end 24 of stem 7 of tool 9 is readily inserted into the socket of body 20 through the hole 42 in plate 41. The detent is then released so that it snaps into groove 34 under the urging of spring 51. The drill may then be rotated to actuate boring bit 9.

When the hole bored by bit 9 is completed and said bit is withdrawn from the hole it is merely necessary to swing detent out of groove 34 and withdraw the adaptor. The adaptor may then be transferred to bit 9 and the boring operation performed with bit 10.

Since the bits 9, 10 are ordinarily standardized for the operations they perform it is preferable to provide a snap ring 54 received within a peripherally extending groove on stem 7 for engaging the guide 5 of the boring jig 1. The position of ring 54 is predetermined so that when the desired depth of hole has been bored farther inward movement of the bit is positively prevented by ring 54 engaging guide 5. At such point continued rotation of bit 7 results in the threads formed in the wood being stripped so that the bit may be readily withdrawn. Of course, since detent 38 is received in groove 34 of the bit stem the bit is easily withdrawn, even against resistance by merely pulling on the drill or boring device to which the adaptor is attached. A similar ring may be employed on stem 8 of bit 10 if desired.

Modified forms of the adaptor are seen in Figs. 7, 8.

In Fig. 7 the adaptor 60 is provided with an axially outwardly opening socket 61 for receiving therein the end portion 62 of the stem 63 of the bit. An axially extending slot 64 is formed between the periphery of the adaptor body and socket 61 and a lever or detent 65 is swingably supported in said slot on a pin 66.

Detent 65 is provided with a cammed tooth 67 at one end for entering a groove 68 formed in stem 63. A flat spring 69 is received in slot 64 and acts on a thumb piece 70 of detent 65 for urging tooth 67 into groove 68. Upon insertion of the stem in the adaptor the tooth 67 automatically snaps into groove 68 and thus locks the adaptor and stem against relative longitudinal movement. To remove the adaptor it is merely necessary to press inwardly on thumb piece 70.

A somewhat similar construction is shown in Fig. 8 except two oppositely disposed detents 75, 76 are employed in the adaptor 77.

It will be understood that the above specific description of the invention is not to be taken as restrictive of the invention as it is obvious that various modifications in design may be resorted to without departing from the spirit of the invention or the following claims.

I claim:

1. In combination with a tool having an elongated stem for rotating the same, an adaptor for securing said tool to the chuck of a drill or the like comprising: an elongated socket member provided at one end with an opening for receiving the end of said stem therein and formed at its other end for reception in a chuck, said stem being formed with a peripherally extending groove, a detent carried by said member and supported for movement from an outer position withdrawn from said groove to an inner position received in said groove, means for urging said detent toward said inner position at all times whereby said stem and member are connected for axial movement together when said element is in said groove, said detent comprising a lever swingably connected to said member and said last mentioned means comprising a spring.

2. An adaptor for connecting the stem of a tool with the chuck of a drill or the like comprising: an elongated socket member provided at one end with an axially outwardly opening recess adapted to receive said stem therein for rotation of said member and stem as a unit, means carried by the other end of said socket adapted to be secured in said chuck for rotating said member with said chuck, a detent carried by said member, said detent comprising a lever swingably supported on said member and provided with a portion positioned outwardly of said one end, spring urged means on said member engaging said portion along a line of action substantially parallel to the axis of said member for yieldably urging said portion inwardly of said stem whereby said portion may be received in a recess in the periphery of said stem.

3. An adapter for rotating tools comprising an elongated body member having a socket opening formed therein for the reception of the stem of the tool and said stem having an annular recess formed therein, leg means secured adjacent the upper end of the body, a plate carried by the lower end of the leg means and extending cross-wise of the open end of the body, said plate having an opening therein out of alignment with the open end of the socket, spring actuated means normally holding the plate in a position where the opening therein and the open end of the socket are out of register, manually operative means for moving the plate to register the openings to permit insertion of the tool stem, and said spring actuated means automatically returning the plate to its normal position with the opening out of register and causing an edge of the plate to enter the recess in the stem to secure it against removal.

4. An adapter for rotating tools comprising an elongated body member providing a socket open at one end for the reception of the stem of the tool and said stem having an annular recess formed therein, means at the other end of the body for connection with a chuck or the like, a pair of arms pivoted adjacent the upper end of the body, a plate carried by the lower ends of the arms and extending cross-wise of the open end of the body, said plate having an opening formed therein out of alignment with the stem receiving socket formed in the body, spring actuated means normally holding the plate in the out-of-alignment position, and manually operative means for moving the plate to align the hole in the plate with the stem receiving recess formed in the body to permit insertion of the tool stem, said spring actuated means automatically returning the plate to its normal position and causing an edge of the hole in the plate to enter the recess in the stem to secure it against removal.

5. An adaptor for connection with a grooved end portion of a tool and including means for connecting the adaptor with a chuck of a drill or the like comprising an elongated hollow body providing a socket, means at one end of the socket for connection with a chuck or the like, the other end of the socket body being open, detent means including leg means disposed adjacent an exterior portion of the body and having an upper end portion secured thereto, and plate means having an opening therein connected with the leg means and extending over the open end of the socket body, spring means carried by the body and engaging the plate means for moving the plate means carried by the leg means laterally of the open end of the body in one direction for automatically misaligning the opening therein with respect to the open end of the socket body, and means on the plate means to limit the lateral movement thereof, in said one direction, whereby when the plate means is moved in a direction opposite said one direction and compressing said spring means the opening therein is aligned with the open end of the body allowing inserting the grooved end portion of the tool in the socket and with discontinuance of the last mentioned movement an edge portion defining the opening in the plate will be disposed in the groove in the tool and thus detachably couple same with the adaptor.

References Cited in the file of this patent
UNITED STATES PATENTS

| | | |
|---|---|---|
| 1,837,403 | Brown | Dec. 22, 1931 |
| 1,851,843 | Inman | Mar. 29, 1932 |
| 2,701,914 | Dietrich | Feb. 15, 1955 |